(12) United States Patent
Brown

(10) Patent No.: US 9,076,561 B2
(45) Date of Patent: Jul. 7, 2015

(54) METHODS AND APPARATUS FOR SELECTIVE GASEOUS EXTRACTION OF MOLYBDENUM-99 AND OTHER FISSION PRODUCT RADIOISOTOPES

(75) Inventor: Lloyd C. Brown, San Diego, CA (US)

(73) Assignee: General Atomics, San Diego, CA (US)

( * ) Notice: Subject to any disclaimer, the term of this patent is extended or adjusted under 35 U.S.C. 154(b) by 797 days.

(21) Appl. No.: 13/156,141

(22) Filed: Jun. 8, 2011

(65) Prior Publication Data

US 2011/0305309 A1   Dec. 15, 2011

Related U.S. Application Data

(60) Provisional application No. 61/353,102, filed on Jun. 9, 2010.

(51) Int. Cl.
*G21G 1/06*   (2006.01)
*G21G 1/00*   (2006.01)

(52) U.S. Cl.
CPC .................. *G21G 1/001* (2013.01); *G21G 1/00* (2013.01); *G21G 2001/0036* (2013.01)

(58) Field of Classification Search
CPC .............. G21G 2001/0036; G21G 2001/0042
USPC .................................. 376/186, 189; 423/2, 60
See application file for complete search history.

(56) References Cited

U.S. PATENT DOCUMENTS 3,102,848 A * 9/1963 Merlub-Sobel ............... 423/261
3,119,747 A * 1/1964 Wallace ......................... 376/415
3,127,325 A * 3/1964 Taylor ........................... 376/395
3,148,941 A * 9/1964 Gens ............................. 423/260
3,208,815 A   9/1965 Bourgeois et al.
3,353,929 A * 11/1967 Knacke ............................. 423/4
4,017,583 A * 4/1977 Motojima et al. ............ 376/186
4,123,498 A * 10/1978 Rosenbaum et al. ............ 423/2
4,163,689 A * 8/1979 Grossman et al. ............ 376/456
4,323,055 A * 4/1982 Kubiatowicz .................. 376/169
5,596,611 A * 1/1997 Ball ............................... 376/189
5,875,385 A * 2/1999 Stephenson et al. .......... 423/260
5,910,971 A * 6/1999 Ponomarev-Stepnoy et al. ............................. 376/189
2010/0266088 A1* 10/2010 Ahlfeld et al. ................ 376/210
2011/0206579 A1* 8/2011 Glenn et al. ....................... 423/2

OTHER PUBLICATIONS

Kupriyanov et al, "Investigations of Radiation Resistant Beryllium Grades for Nuclear Fusion Applications", pp. 944-947, IEEE/NPSS Symposium on Fusion Engineering—SOFE , 1995.*

(Continued)

*Primary Examiner* — Jack W Keith
*Assistant Examiner* — Daniel Wasil
(74) *Attorney, Agent, or Firm* — Jones Day; Jaime D. Choi

(57) ABSTRACT

Methods and apparatus are provided for producing and extracting Mo-99 and other radioisotopes from fission products that overcome the drawbacks of previously-known systems, especially the excessive generation of radioactive wastes, by providing gas-phase extraction of fission product radioisotopes from a nuclear fuel target using a mixture including halide and an oxygen-containing species with heat to convert the fission product radioisotopes to gas (e.g., Mo-99 to $MoO_2Cl_2$ gas). The gaseous species are evacuated to a recovery chamber where the radioisotopes solidify for subsequent processing, while the substantially intact uranium target made available for further irradiation and extraction cycles.

24 Claims, 3 Drawing Sheets

(56) References Cited

OTHER PUBLICATIONS

International Search Report for PCT/US2011/039551, 10 pages, mailed Mar. 26, 2012.
Written Opinion for PCT/US2011/039551, 7 pages, mailed Mar. 26, 2012.
Australian Patent Office, Notice of Acceptance dated Mar. 16, 2015 for Australian Patent Application 2011264982, with approved description and claims.
Australian Patent Office, Patent Examination Report No. 3 dated Oct. 29, 2014 for Australian Patent Application 2011264982.
Australian Patent Office, Patent Examination Report No. 2 dated Jun. 25, 2014 for Australian Patent Application 2011264982.
Australian Patent Office, Patent Examination Report No. 1 dated Oct. 14, 2013 for Australian Patent Application 2011264982.
European Patent Office, Notice of Acceptance dated Feb. 20, 2015 for European Patent Application 11764369.2-1556, with approved description and claims.

* cited by examiner

METHODS AND APPARATUS FOR SELECTIVE GASEOUS EXTRACTION OF MOLYBDENUM-99 AND OTHER FISSION PRODUCT RADIOISOTOPES

I. CROSS-REFERENCE TO RELATED APPLICATIONS

This application claims the benefit of priority of U.S. provisional application Ser. No. 61/353,102, filed Jun. 9, 2010.

II. FIELD OF THE INVENTION

This application generally relates to apparatus and methods for extracting the isotope Molybdenum-99 and certain other fission product radioisotopes for medical and/or commercial purposes in a timely, economical manner and with reduced radioactive waste byproducts.

III. BACKGROUND OF THE INVENTION

A wide variety of radioactive isotopes are known for use in medical, industrial, research, and commercial applications. In general, such radioisotopes are produced by nuclear fission or by irradiating target isotope materials with nuclear particles, such that the target atoms either transmute directly into the desired isotope, or a desired radioisotope is produced through a chain of absorption and decay that subsequently generates the desired radioactive product.

One particularly important radioisotope, widely used in medical imaging, is Technetium-99m (Tc-99m), which is a metastable isotope that results from beta decay of Molybdenum-99 (Mo-99). Tc-99 is a pure gamma emitter with a 6 hour half-life, emitting mono-energetic 140.5 keV photons. Mo-99 may be made either by bombarding Mo-98 with neutrons or protons, or by the only method of Mo-99 production approved by the FDA for medical use; the extraction of Mo-99 from the fission products of Uranium-235 (U-235). Tc-99m is used in approximately 80 percent of all nuclear medicine diagnostic procedures, and in roughly 50,000 diagnostic and therapeutic nuclear medicine procedures performed daily in the United States, including diagnosis of heart disease, treating cancer, and studying organ structure and function. However, the short half-life of Tc-99m requires that it be produced continuously to meet the medical community's needs.

Presently, most of the world's supply of Mo-99 for medical applications comes from only a few reactors, all of which are nearing end of life, and none of which are located in the United States. For example, Canada's National Research Universal (NRU) reactor at the Atomic Energy of Canada's (AECL's) Chalk River Laboratories in Ontario, Canada, produced a high percentage of the world's medical and industrial radioisotopes, including Mo-99. However, in November 2007, NRU was shutdown due to a heavy water leak and did not resume Mo-99 production operations until September 2010. In February 2010, the 49-year-old High Flux Reactor in the Netherlands was shutdown for a four-month maintenance period. Even routine maintenance of such facilities can cause significant disruption in the supply of Mo-99 and Tc-99m available for medical applications. Also the processing and distribution of isotopes is complex and constrained, which can be critical when the isotopes concerned are short-lived. A need for increased production capacity and more reliable distribution is evident.

Reacting to projected shortfalls in Tc-99m availability, and to address concerns about proliferation arising from the use of high-enriched uranium (HEU), the United States Congress has called for all Mo-99 to be supplied by reactors running on low-enriched uranium (LEU), e.g., having U-235 enrichments of 20% or less. Congress also has sought proposals for an LEU-based supply of Mo-99 for the US market that would supply 111 six-day Terabecquerel (TBq) per week by mid-2013.

Two different technologies currently are available to provide the source of radiation for Mo-99 production: fission nuclear reactors, which produce a flux of neutrons; and particle accelerators or cyclotrons, which produce a flux of charged particles. In one method of production, a target of natural molybdenum or molybdenum enriched in Mo-98 is irradiated by a neutron flux in a nuclear reactor. Mo-99 results from neutron radiation capture. The irradiated target then undergoes reprocessing to extract and isolate the Mo-99. This method, however, has a low yield and is characterized by a low specific activity due to presence of Mo-98 in the final product.

The only method currently approved by the U.S. Food and Drug Administration (FDA) for the production of Mo-99 consists of irradiating an enriched uranium target in a nuclear reactor and then chemically extracting Mo-99. In this method, a uranium target comprising a U—Al alloy or electroplated target, containing enriched U-235, is irradiated in a nuclear reactor to cause the U-235 to fission. Currently 93% enriched uranium is used but efforts are underway to employ 20% enriched uranium. After irradiation, the target is dissolved and the resultant solution processed by any of a number of previously-known radiochemical processing methods to extract Mo-99 from the fission products. The specific activity achieved by this method is several tens of kilocuries per gram of molybdenum. A serious drawback of this method, however, is that it generates large amounts of radioactive wastes during recovery of the Mo-99, which typically exceed the amount of recovered Mo-99 by two orders of magnitude. Also, the waste contains almost all of the U-235 originally contained in the target. In the case of highly enriched uranium, the waste presents a proliferation problem as the waste could be diverted to weapons production. In addition, such previously-known methods usually involve at least a 24-hour cool-down period prior to processing the irradiated uranium targets, during which time the Mo-99 activity decreases by at least 22%. After a two-day delay, the activity of the waste byproducts exceeds that of the Mo-99 by a factor of six or seven. The problem of long-lived fission byproduct management is therefore a major disadvantage in the production of Mo-99 by previously-known methods.

U.S. Pat. Nos. 4,017,583 and 4,123,498 disclose the use of oxygen to strip $MoO_3$ gas from uranium oxide at very high temperatures. The oxygen/chlorine mixture of this invention forms $MoO_2Cl_2$ which becomes a gas at a much lower temperature than $MoO_3$. The vapor pressure of $MoO_3$ is $10^{-13}$ atmospheres at 400° C. while $MoO_2Cl_2$ is totally vaporized at this temperature.

U.S. Pat. No. 5,596,611 discloses a small, dedicated uranyl nitrate homogeneous reactor for the production of Mo-99 in which the radioactive waste products are recirculated back into the reactor. A portion of the uranyl nitrate solution from the reactor is directly siphoned off and passed through columns of alumina to fix some of the fission products, including Mo-99, to the alumina. The Mo-99 and some fission products on the alumina column then are removed through elution with a hydroxide and the Mo-99 is either precipitated out of the resultant elutriant with alpha-benzoinoxime or passed through other columns. This uranyl nitrate reactor has the advantage of recycling the fission byproducts, but the conventional extraction method to obtain Mo-99 is relatively inefficient.

U.S. Pat. No. 5,910,971 discloses the ability to produce Mo-99 directly from the uranyl sulfate solution of an aqueous-homogenous solution nuclear reactor. The solution of the reactor is pumped through a solid sorbent material that selectively absorbs the Mo-99. The uranyl sulfate and all fission products not adhering to the sorbent are returned to the reactor vessel. This invention only takes place after shutdown and following a cool-down period, during which a large percentage of the available Mo-99 decays.

In view of the above-noted drawbacks of previously-known systems, it would be desirable to provide methods and apparatus for producing and extracting Mo-99 that would enable the establishment of a robust and reliable domestic U.S. supply of Mo-99. If it can be easily accomplished, it is also desirable to extract other useful fission product isotopes at the same time such as Xe-135, Kr-85, I-133, I-135, Cs-137, Nd-147, Rh-105, Pr-143 and Pm-147 and others.

Due to the long lead times needed to obtain regulatory approval for new reactor designs, it would be particularly desirable to provide methods and apparatus for producing and extracting Mo-99 suitable for use with existing reactor facilities and modes of operation.

Further, due to the short half-lives of Mo-99 and other radioisotopes, it would be desirable to provide methods and apparatus that reduce the time required to extract the radioisotopes, and thus increase the available amounts of such material.

It still further would be desirable to provide methods and apparatus for producing and extracting Mo-99 that reduce the wastes resulting from production and processing of Mo-99, thereby reducing the burden on existing long-term waster storage facilities.

Furthermore, it would be desirable to return the target, with its U-235 content directly back to the reactor for more Mo-99 production without additional chemical processing.

It also would be desirable to provide methods and apparatus for producing and extracting Mo-99 that enable the use of low enriched uranium targets, thereby furthering the goal of reducing worldwide distribution of highly enriched uranium and lessening the prospects for diversion and proliferation.

IV. SUMMARY OF THE INVENTION

The present invention provides methods and apparatus of producing and extracting Mo-99 that overcomes the drawbacks of previously-known systems. Exemplary embodiments of the present invention include gas-phase extraction of Mo-99 from a uranium target as molybdenum oxychloride ($MoO_2Cl_2$), preferably using a mixture including oxygen and a halogen, preferably chlorine, thereby enabling Mo-99 to be produced faster, with less capital equipment, and less radioactive waste than previously-known methods. The halogen preferably comprises chlorine gas, but may be any source of chlorine, bromine or iodine, while the oxygen component of the mixture may comprise any oxygen-containing gas capable of suppressing formation of uranium chlorides, including, but not limited to, $O_x$, $H_2O$, $NO_x$, $CO_x$ and $ClO_x$ where x can take on any chemically permissible value (e.g. $O_2$, $O_3$, $N_2O$, $NO$, $NO_2$, $N_2O_4$, $CO$, $CO_2$, $ClO$, $Cl_2O$, $Cl_2O_2$, $ClO_2$, $ClO_3$). As described herein, an oxygen and chlorine mixture refers not only to a combination of chlorine gas ($Cl_2$) with oxygen gas ($O_2$) but also to a mixture with any of the above-identified oxygen-containing gases, including oxygen formed by heating uranium oxides or by partial reaction of chlorine with uranium oxides.

In accordance with one aspect of the present invention, the gas-phase extraction method is applied to reusable uranium targets suitable for use in existing reactors, such as the TRIGA® (a registered trademark of General Atomics, San Diego, Calif.) reactor, thereby enabling establishment of a robust and reliable domestic U.S. supply of Mo-99. In accordance with the present invention, uranium targets may be irradiated in nuclear reactors and subjected to the gas-phase extraction process on a rotating basis, e.g., on alternating days, so that a relatively small number of uranium targets may be employed to provide a nearly continuous supply of Mo-99. Alternatively, the uranium targets may be continuously extracted by flowing gases during irradiation. Any nuclear reactor may be used for the irradiation but a research reactor or a reactor built specifically for isotope production may be better adapted towards Mo-99 production than a power production reactor due to the short irradiation time.

In accordance with another aspect of the present invention, the gas-phase extraction method of the present invention is uniquely suited to the typical operating schedule of existing research or test reactors, which typically are cycled between full power operation and operation at low power or no power for periods on a daily basis. Such a schedule provides ample time to remove one uranium target for gas-phase extraction processing while substituting another uranium target for irradiation to produce Mo-99.

In accordance with a further aspect of the present invention, a reusable uranium target is provided comprising a corrosion resistant tube containing uranyl oxide ($UO_3$) or triuranium octoxide ($U_3O_8$) in the form of powder, granules, a porous pellet, a porous plate or a porous annular matrix. In one embodiment the uranium target is enriched in U-235 and is externally configured so as to be interchangeable for a reactor fuel rod or peripheral reflecting member. In preferred embodiments, the uranium target is filled with a noble gas, e.g., helium, to facilitate heat transfer arising from the fission of U-235 within the $UO_3$ or $U_3O_8$ during irradiation, and may include one or more valves that permit the helium fill gas to be replaced with a oxygen/chlorine mixture during the gas-phase extraction processing. The corrosion resistant tubing may comprise a single material or several materials layered so as to provide both chemical resistance to both the external reactor coolant, nominally cold water, the external atmosphere during Mo-99 extraction, nominally hot air, and the internal chlorine oxygen atmosphere. The preferable single material is a fracture resistant high temperature ceramic that is resistant to the complete range of chemical and thermal environments, such as silicon carbide-silicon carbide composite (SiC—SiC). Alternatively, the corrosion resistant tubing may comprise a high temperature metallic alloy outer tube and an inner tube, such as quartz which is resistant to the corrosive effects of the oxygen and chlorine gas mixture introduced into the uranium target during the Mo-99 gas-phase extraction process. If the inner corrosion resistant tube is comprised of silicon carbide, a barrier layer may be required to prevent reaction of the silicon carbide with the high temperature alloy. The barrier layer can be any one of several materials that are compatible at high temperatures with both metallic alloys and silicon carbide such as silicon dioxide or a silicon dioxide/magnesium silicate composite.

In some embodiments, the uranium target may comprise highly enriched uranium (>20% U-235) but more preferably comprises low enriched (<20% U-235) uranium, thereby furthering the goal of reducing worldwide distribution of highly enriched uranium and lessening the risks of diversion and proliferation. Alternatively, embodiments designed for use with heavy water reactors may use unenriched, natural uranium. In accordance with the principles of the present invention, Mo-99 may be periodically extracted from the reusable uranium target, while the bulk of the fission byproducts remain trapped within the uranium target, which is disposed along with other reactor fuel when fully depleted. The methods and apparatus for producing and extracting Mo-99 of the present invention therefore are expected to significantly reduce the burden on existing long-term radioactive waste storage facilities compared to existing methods.

In accordance with a further aspect of the present invention, a gas-phase extraction system is provided for extracting and recovering the Mo-99 from the irradiated uranium target. In one embodiment, an extraction system is provided comprising an extraction gas filling system for evacuating the uranium target and introducing an oxygen and chlorine mixture, a heater for heating the uranium target to cause the chlorine to react with the molybdenum oxide to form molybdenum oxychloride ($MoO_2Cl_2$) gas, and a recovery chamber into which the $MoO_2Cl_2$ gas is drawn and cooled, so that the Mo-99 is deposited within the recovery chamber as solid $MoO_2Cl_2$. The oxygen which accompanies the chlorine acts to prevent the formation of volatile uranium chlorides which would otherwise vaporize in significant quantities. In some embodiments, the heater heats the uranium target to a temperature in excess of 500 C, and more preferably to a temperature in a range of 800 C to 1500 C to increase the rate of $MoO_2Cl_2$ formation. Other desirable fission products such as isotopes of Ke, Xe, I and Cs may be extracted from the gases exiting the recovery chamber and in addition desirable isotopes of Rh, Pr, Pm, etc., can be chemically separated from the deposited $MoO_2Cl_2$. Other semi-volatile isotopes can be condensed from the extraction gases at higher temperatures, prior to condensation of the $MoO_2Cl_2$.

In embodiments in which the uranium target is reused, the gas-phase extraction system also may be configured to refill the uranium target with a suitable noble gas following removal of the oxygen and chlorine gas mixture. In an alternative embodiment, the fill gas may comprise a mixture of oxygen, chlorine and helium gas, such that the uranium target may be heated following irradiation to cause the Mo-99 to react with the chlorine is formed during irradiation, thus avoiding the step of replacing the helium fill gas with the oxygen and chlorine gas mixture.

In accordance with one exemplary method embodying the present invention, a low enrichment uranium target configured as described above is irradiated in a pool-type research reactor for a 24-hour period. The uranium target is removed from the reactor and placed in a gas-phase extraction system in which the uranium target is coupled to a gas transfer system for removal of gaseous fission products, such as krypton and xenon, and a mixture of oxygen and chlorine is introduced into the uranium target. The target then is heated to a temperature of up to 1500° C. so that the Mo-99 in the uranium target reacts with the chlorine and oxygen atmosphere to form $MoO_2Cl_2$. Next, the unreacted chlorine and oxygen gases as well as other oxygen containing species, $MoO_2Cl_2$ gas and other gases are extracted from uranium target to a recovery chamber, which preferably is cooled. Upon passing into the recovery chamber, the gases cool so that the semi-volatile isotopes and Mo-99 plate-out on the walls of the recovery chamber. The Mo-99 within the recovery chamber then may be processed using methods known in the art to isolate the Mo-99 and other desirable isotopes in the desired forms.

Alternatively, after the step of heating the uranium target and oxygen/chlorine mixture to a high temperature to facilitate the formation of $MoO_2Cl_2$ and prior to removal of the gases to the recovery chamber, the uranium target first may be cooled to a lower temperature, such as 400 C to 600 C, to cause some of more volatile radioactive species, such as $UO_3$ vapor and uranium oxychloride ($UO_2Cl_2$), to redeposit within the uranium target, while the $MoO_2Cl_2$ and volatile fission products remain in gaseous form, thus reducing the quantity of uranium removed from the target but also precluding separation of the desired semi-volatile fission products. In preferred embodiments, the efficacy of Mo-99 extraction will depend on the volatility of $MoO_2Cl_2$ relative to uranium oxychloride ($UO_2Cl_2$) and other fission product species in the oxygen/chlorine atmosphere and upon the economic incentive for recovery of the semi-volatile isotopes.

To one skilled in the art, there are an innumerable number of ways that this invention, the use of chlorine to convert molybdenum in to the very volatile oxychloride while simultaneously using oxygen to suppress the formation of the very volatile chlorides may be implemented.

V. BRIEF DESCRIPTION OF THE DRAWINGS

VI. DETAILED DESCRIPTION OF THE INVENTION

Figure 1:
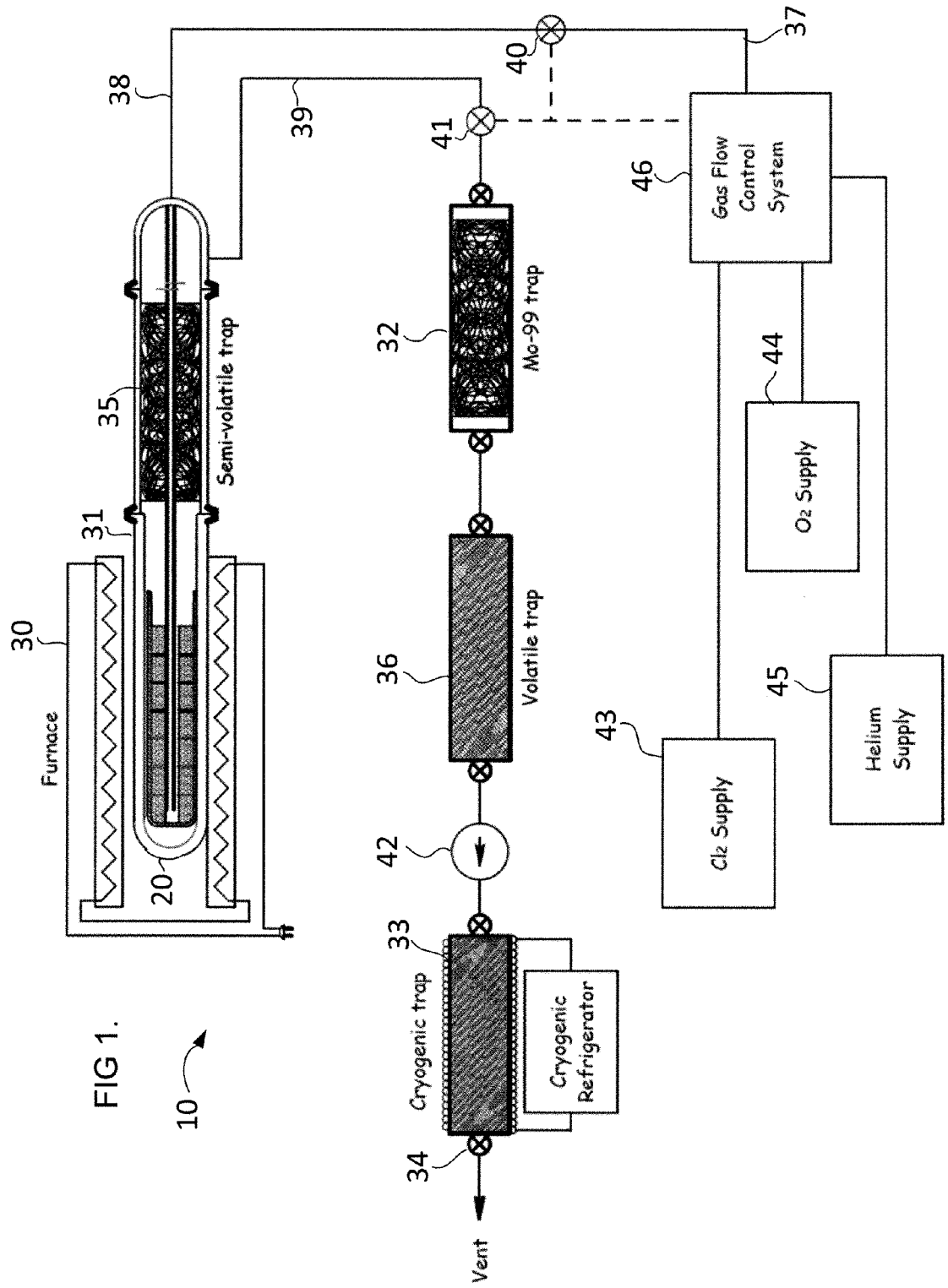
FIG. 1 is an exemplary embodiment of a system constructed in accordance with the principles of the present invention for producing and extracting Mo-99.
Figure 2:
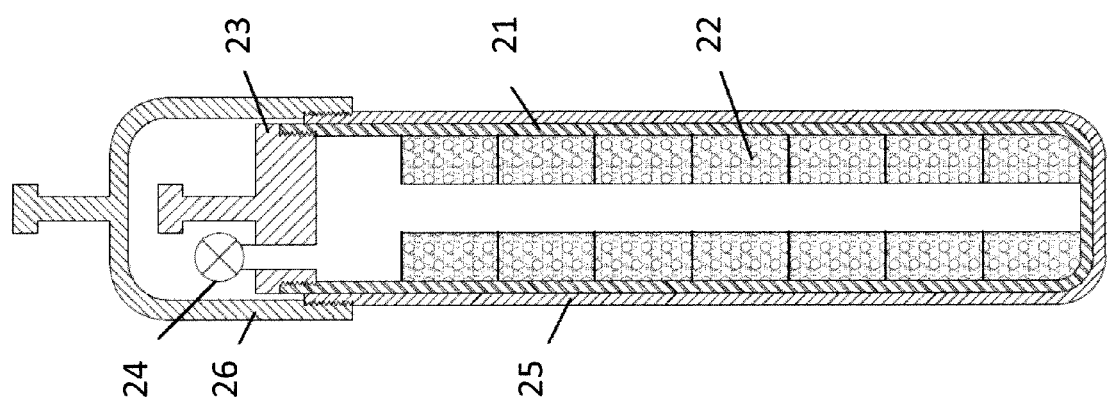
FIG. 2 is a longitudinal sectional view of an exemplary embodiment of a uranium target suitable for use with the gas-phase extraction methods of the present invention.

Referring to FIGS. 1 and 2, an exemplary embodiment of a system for generating and extracting fission product radioisotope (such as Mo-99) from a nuclear fuel target in accordance with the principles of the present invention is described. System 10 is configured to process nuclear fuel target 20 that has been irradiated in a nuclear reactor to extract fission product radioisotope (such as Mo-99) formed within the target by fissioning U-235. Nuclear fuel target 20, described in greater detail with respect to FIG. 2 includes primary containment 21 filled with nuclear fuel powder or porous pellets 22, and includes cap 23, gas equipped with valved port 24. Nuclear fuel target 20 may, for safety concerns, be incased in a secondary containment consisting of shell 25 and cap 26. Nuclear fuel target 20 is configured to be irradiated in a nuclear reactor, preferably a reactor configured for easy and rapid insertion of irradiation targets, such as the TRIGA® (a registered trademark of General Atomics, San Diego, Calif.), and then removed for processing in system 10, as described hereinafter.

Extraction system 10 includes furnace 30 configured to remotely accept the nuclear fuel containing portion of target 20 within furnace tube 31. System 10 further includes a subsystem for trapping the products and waste materials removed from the target and a subsystem used to monitor and control gas flow rates and conditions within the trapping subsystem. The trapping subsystem comprises, at a minimum, a trap 32 in which the Mo-99 is collected, and cryogenic trap 33 in which radioactive xenon and krypton are collected and a means of venting non condensables 34. Additional traps may be included to trap semi-volatiles 35 and volatiles 36 as a means reducing the amount of chemical separation required to purify the Mo-99 and secondary products. These traps preferably incorporate valves allowing the traps to be removed from the system to transport the products to separate chemical separation systems. The control and monitoring system comprising gas flow lines 37, 38 and 39, flow selection valves 40 and 41, evacuation pump 42, chlorine 43, oxygen 44 and helium 45 gas supply systems, together with the automatic process control system 46. The process control system 46 includes all components required to control and monitors gas flow rates into the trapping system, flow out of the trapping system, system temperatures, and system pressures.

As illustrated in FIG. 1, gas flow line 37 may either be configured to either flow gases into the furnace tube 31 via line 38 and valve 40 or to evacuate the furnace tube through line 39 and valve 41. Valves 40 and 41 are preferably air operated bellows-sealed valves under programmed control of controller 46. Depending upon the stage of the gas-phase extraction process, valve 40 may be configured to introduce an oxygen/chlorine/helium mixture from gas supplies 43, 44 and 45 into the furnace tube 31, containing nuclear fuel target 20, or valve 41 may be configured to exhaust the gaseous contents of the furnace tube through the traps where the various components condense. This filling and evacuation sequence may be repeated several times to complete the Mo-99 recovery to the desired extent. The gas composition may be varied from cycle to cycle such that oxygen and chlorine are employed in the first extraction but tending towards pure helium for subsequent cycles after the chemical reactions forming extractable species is complete. Upon completion of the extraction process, nuclear fuel target 20 will be removed from the furnace tube and the cap 23 installed. The target will be connected to line 39 via valved port 24 in place of the furnace tube and the nuclear fuel target will be evacuated and backfilled to sub atmospheric pressure with helium from supply system 45 to is prepared for a further cycle of irradiation in a nuclear reactor.

As will be apparent to one of ordinary skill in the design of gas processing equipment, oxygen/chlorine/helium system optionally may be replaced with a series of individual reservoirs or pressurized tanks, e.g., containing chlorine gas and an oxygen-containing species, the contents of which are mixed prior to being supplied to valve 40 and gas inflow line 38. As will be evident to one of ordinary skill, extraction system 10 may include pressure regulators and flow controllers and pressure sensors to ensure that the oxygen/chlorine/helium mixture is introduced to the furnace tube or nuclear fuel target at a desired pressure and composition and temperature controllers to ensure that the furnace and each trap is at the proper temperature at each step in the extraction process.

Prior to extraction, the nuclear fuel target 20 will preferably be immersed in liquid nitrogen to minimize the vapor pressure of the radioactive gasses while the target is backfilled with helium via valved port 24. After removing cap 23 from the shell 21 the cool target will be remotely inserted into the furnace tube 31 and the system assembled and sealed. Thereafter, the furnace tube will be evacuated and the furnace heated to operating temperature with each trap maintained at the appropriate temperature for collection of the desired volatile or semi-volatile components. The traps may be empty reservoirs but preferably contain a high surface area material such as quartz wool or activated charcoal to increase contact with the gas and enhance condensation of the volatile products at the temperature of the trap. The choice of packing material will depend upon the species to be trapped, the temperature and if the adsorption is intended to be temporary, for products, or permanent, for waste.

In accordance with one aspect of the present invention, furnace 30 may comprise a resistive or induction furnace configured to accept an irradiated nuclear fuel target 20 and capable of heating the nuclear fuel target to a temperature in a range of up to 1500 C. Preferably, furnace 30 includes temperature sensors and regulation circuitry that enable the heater to heat the nuclear fuel target to one or more preset temperatures, as may be required for different steps of the gas-phase extraction process. For example, in an embodiment where collection of the semi-volatile fraction of fission products is not implemented, the nuclear fuel target 20 is directly coupled to line 39 via valved port 24. After the target has its fill gas and any volatile fission products evacuated and replaced with a desired oxygen/chlorine/helium mixture, it may be desirable to first heat the nuclear fuel target to a temperature of 800 C to 1500 C to cause the chlorine to bind with and extract the Mo-99. Then, furnace 30 may be adjusted to reduce the temperature of the nuclear fuel target to a lower temperature, e.g., such as 200 C to 600 C, that permits at least some of the semi-volatile gaseous products, e.g., such as nuclear fuel oxychloride to plate out, while retaining the Mo-99 in the form of $MoO_2Cl_2$ gas. In this manner, the amount of nuclear fuel transferred from the target may advantageously be reduced but precluding the recovery of the semi-volatile fission products.

Still referring to FIG. 1, Mo-99 trap 32 comprises a tubular member, such as a high temperature material resistant to chlorine and oxygen, such as quartz or preferably a SiC—SiC composite, and includes an inlet port and an outlet port, each port being equipped with a closure, preferably a valve, allowing a filled trap to be removed from the system for transfer to a chemical purification system. In operation, Mo-99 trap 32 is to be placed within a temperature controlled region, so that gases vented through the trap cool quickly to the trap temperature. In a preferred embodiment, high temperature gases, including $MoO_2Cl_2$ are vented or drawn from heated nuclear fuel target 20 through gas line 39 and valve 41 into Mo-99 trap 32. Upon entering Mo-99 trap 32, the gases rapidly cool, so that the Mo-99 contained as $MoO_2Cl_2$ gas promptly condenses and solidifies on the walls or high surface area material within the Mo-99 trap. Thence, any remaining gases may be vented through volatile trap 36 for subsequent storage, recovery or disposal and thence, via evacuation pump 42 through cryogenic trap 33 for removal of the remaining fission products from the helium background gas. Mo-99 trap 32 then is sealed, removed from the cooling circuit, and shipped to a Mo-99 processor, such as MDS Nordion, Ottawa, Canada, in a suitably shielded shipping contained for hot cell processing using known techniques to recover the Mo-99 and other desirable semi-volatile fission products. An empty Mo-99 trap may be inserted in place of the filled trap for use during the next gas-phase extraction process. Volatile trap 36 and cryogenic trap 33 may likewise be sealed and shipped for isotope recovery or isolated and stored for isotope decay and subsequent reuse.

Process control system 46 may comprise a suitably programmed general purpose computer, or alternatively a special purpose computer, that is coupled to valve actuators of valves 40 and 41, furnace 30, and various flow controlling and measuring devices, and pressure, temperature and radiation level sensors (not shown) employed throughout the system to automate processing of an irradiated nuclear fuel target 20 to extract Mo-99 between the time it is removed from a nuclear reactor, during the gas-phase extraction process and fill gas replenishment, through the time it is returned to the reactor core for another irradiation cycle. Process control system 46 preferably is programmed to control and automate at least some of the processes involved in the gas-phase extraction process as described below with respect to FIG. 3. Alternatively, in a less-preferred embodiment, controller 46 may be omitted, and each of the process steps performed by human intervention.

Referring now to FIG. 2, an exemplary embodiment of nuclear fuel target 20 constructed in accordance with the principles of the present invention is described. Although nuclear fuel target 20 is described in the context of a fuel rod such as that described in U.S. Pat. No. 3,119,747 and suitable for use in a TRIGA® reactor, or other reactors of other designs suitable for using targets constructed as described herein, such as described in U.S. Pat. No. 3,127,325, it should be understood that nuclear fuel target 20 is exemplary only, and alternative nuclear fuel target designs may be configured for other reactor types without departing from the principles of this invention. Such other configurations may include locations within the reflector or blanket, within an unfueled region, within the core or as a replacement for core elements.

As described in U.S. Pat. No. 3,127,325, a preferred reactor for use with the nuclear fuel target of the present invention is a research reactor having fuel elements comprising a homogenous mixture of low enriched nuclear fuel (about 20% U-235) and zirconium hydride. Such reactors are widely in use as training facilities at a number of universities in the United States, including California, Oregon, Pennsylvania, Texas, Washington and Wisconsin, and also at universities worldwide. Advantageously, reactors such as the TRIGA® reactor or reactors of other designs suitable for using targets constructed as described herein, provide a sufficiently high neutron flux to cause fission of the U-235 contained with the target, and are open-pool reactors that do not employ closed containment systems or high-pressure coolants, thus making insertion and removal of nuclear fuel targets straightforward. In addition, because university research reactors are designed for frequent cycling between full power and periods of reduced or no power, such reactors provide ample opportunity to swap nuclear fuel targets on a daily basis with little or no adverse impact on other reactor operations. Although pool type research reactors are preferred, use of other reactor types is not precluded in conjunction with this invention.

In one embodiment, nuclear fuel target 20 may have external dimensions similar to those described in U.S. Pat. No. 3,119,747, so that the nuclear fuel target may be substituted for a conventional fuel element, without adversely impacting either the reactor physics or thermohydraulic performance. In one embodiment, it is contemplated that up to eight nuclear fuel targets 20 will be substituted for conventional fuel elements at selected locations within the reactor core or on the periphery of the core. As described below, a total of 16 such nuclear fuel targets may be associated with an individual Mo-99 production system, such that at any time eight nuclear fuel targets are being irradiated in the reactor while eight others are removed from the reactor core for Mo-99 extraction. In this manner, a virtually continuous supply of Mo-99 can be harvested from the reactor without adversely affecting reactor operation.

In alternate embodiments, the nuclear fuel target 20 may have external dimensions similar to those of any other reactor in which the invention is installed. Alternatively, the target may be located in the reflector region of the reactor or in the central core of an annular reactor and incorporate what ever dimensions and geometry that are appropriate for the design location.

As depicted in FIG. 2, the nuclear fuel targets preferably will comprise tubular primary containment 21 filled with powder 22 comprising low enriched uranium (<20% U-235) as either uranyl oxide ($UO_3$) or triuranium octoxide ($U_3O_8$) (collectively referred to hereinafter as "uranium powder"). Uranium powder 22 may be in the form of granules, e.g., having a mean diameter less than 10 microns, may be compressed into larger pellets, or may comprise porous annular pellets. It is expected that, in spite of the phase transition accompanying conversion of at least some of the $U_3O_8$ to $UO_3$ during the gas-phase extraction/heating and cooling process, the integrity of the granules of the uranium powder will remain sufficiently intact and not be subject to aggregation and/or densification. As will be apparent to one skilled in the art, the target need not be cylindrical, but may be in the form or plates or even as annular elements containing a central cooling channel. As will of course be apparent, levels of enrichment in U-235 greater than 20% may be used, but disadvantageously such use would not further U.S. Congress' goal of reducing the distribution of highly enriched uranium as a guard against nuclear weapon proliferation.

Exemplary nuclear fuel target 20 further comprises cap 23 with valved gas port 24, secondary containment 25 and secondary containment cap 26. The nuclear fuel powder 22 may be loose powder but preferably is in the form. of lightly compacted annular pellets enable an oxygen/chlorine mixture introduced into nuclear fuel target 20 ready access to the complete volume of nuclear fuel powder 22, such the resulting $MoO_2Cl_2$ gas may be withdrawn from the nuclear fuel target through the upper plenum space. Cap 26 covers and protects valved gas port 24 and includes a handling feature so that the nuclear fuel target may be inserted and removed from the reactor core using existing fuel element handling equipment. Cap 26 may be fastened to secondary containment casing using any suitable fastening means, for example, using threads that engage complimentary threads on the exterior of container 25. Alternatively, the target 20 may include a second valved port incorporating a gas passage to the far extent of the nuclear fuel powder 22, in which case the target may be simultaneously filled and evacuated.

Primary containment 21 may comprise a suitable high temperature fracture resistant chlorine/oxygen resistant ceramic such as SiC—SiC composite or quartz. The secondary containment 25/26 need only resist corrosion of hot water, unless it is retained with the primary containment during extraction in which case it must be a high temperature alloy such as Inconel 617 or SiC—SiC composite. In the case of a metallic secondary containment, it must not contact the chlorine/oxygen gas mixture at elevated temperature and, if used with a silicon carbide containing primary containment, it must be isolated from contact with at temperature by a barrier layer compatible with both metals and silicon carbide such silicon dioxide or silicon dioxide/magnesium silicate composite. As will be apparent from the discussion below, both primary containment 21/23 and secondary containment 25/26 comprise materials capable of retaining their structural integrity and corrosion-resistant properties during repeated exposure to neutron irradiation during in-reactor periods and heating by furnace 30 during the gas-phase extraction process.

Figure 3:
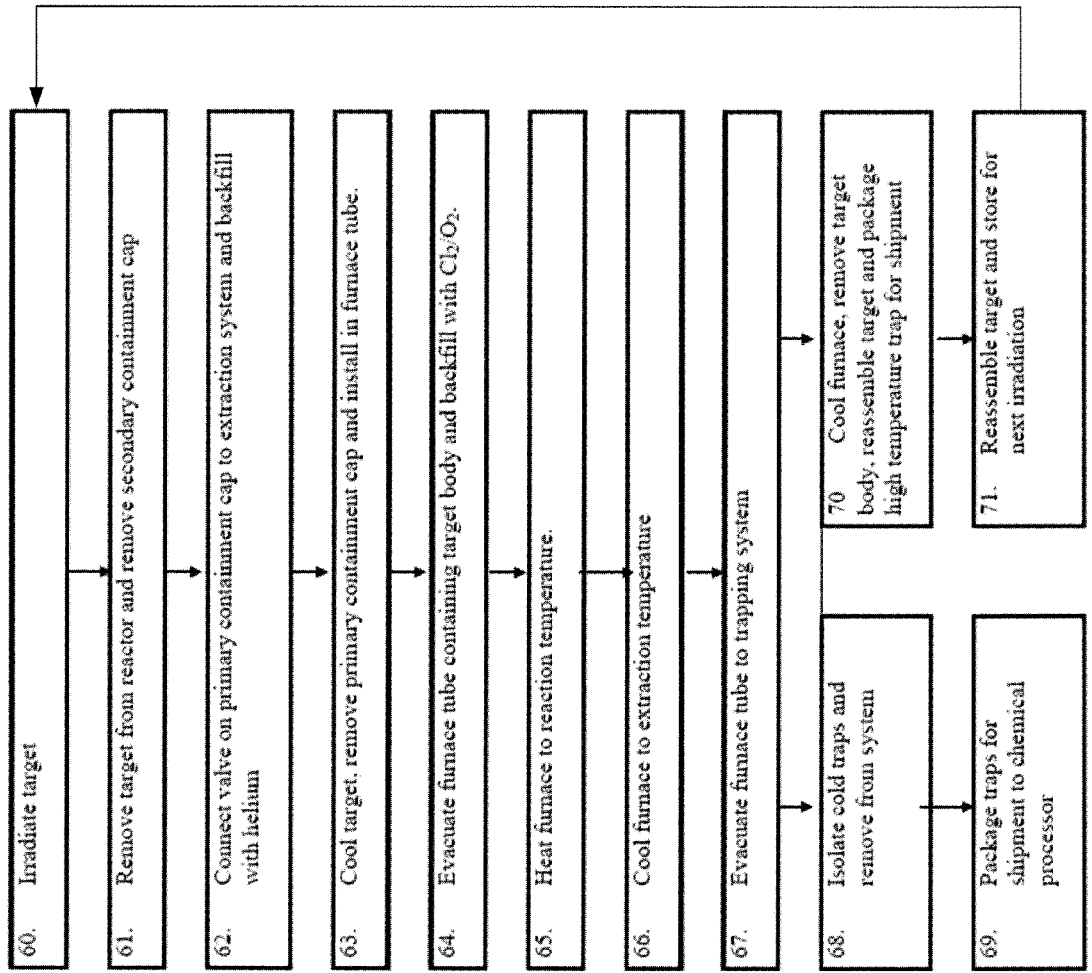
FIG. 3 is a flow chart illustrating the steps of an exemplary embodiment of the gas-phase extraction process of the present invention.

Referring now to FIG. 3, an exemplary gas-phase Mo-99 extraction process in accordance with the principles of the present invention is described. In step 60 of the process, exemplary nuclear fuel target 20, constructed as described with respect to FIG. 2, is inserted into a nuclear reactor. The reactor preferably is an open-pool type, low enriched nuclear fuel reactor, where the nuclear fuel target is irradiated for a predetermined period, e.g., 24 hours. At step 61, when the reactor is powered down, the nuclear fuel target is promptly moved, preferably using pre-existing fuel element handling equipment, to a pool location where the secondary containment cap 26 is removed. At step 62 the primary containment is connected to line 39 of the extraction system via valved port 24, the containment 21/23 is backfilled with helium and evacuated through lines 37, 38 and valve 40. At step 63 secondary containment is cooled to cryogenic temperatures, backfilled with helium, the cap 23 is removed, the containment vessel 21 is inserted into the furnace tube 31 and the system is connected as illustrated in FIG. 1. The components of system 10, as described above with respect to FIG. 1, may be set-up, for example, in a hot cell adjacent area of the building that houses the reactor with the radioactive components installed in a shielded hot cell.

At step 64, the furnace tube is evacuated through line 39 and valve 41, then valve 40 is opened and the furnace tube containing the containment vessel is filled with the appropriate chlorine/oxygen/helium mixture to a pressure such that when heated to the extraction temperature, the internal pressure will be slightly less than the local atmospheric pressure. In step 65 the furnace 30 is heated to the appropriate reaction temperature and held for sufficient time for the reaction producing $MoO_2Cl_2$ to proceed to completion, and then the furnace is cooled to the desired extraction temperature step 66. The extraction temperature will depend on which, if any, semi-volatile fission products are desired as secondary products. Valves 40 and 41 are reconfigured for step 67 to evacuate the $MoO_2Cl_2$ and other fission product gases through the trapping system with the various traps at the temperature required to perform their intended function. Each fission product will be in its thermodynamically stable chemical form relative to the chlorine/oxygen partial pressures in the system, whether oxide, oxychloride, chloride or element and will condense at within the trapping system at the location dictated by the temperature of the trap. After step 67 valves 40 and 41 are reconfigured to refill the furnace with helium to just under atmospheric pressure (step 70). In step 68, the Mo-99 trap 32, the volatile trap 36 and the cryogenic trap 33 are isolated using the incorporated isolation valves and detached from the system. In step 69, each trap is then packaged for shipment in the appropriate shielded cask for transfer to final chemical separation or held until the activity as decayed sufficiently for reuse. Step 70 entails cooling the furnace and those traps that are operated at elevated temperature to near room temperature while maintaining a helium atmosphere at near atmospheric pressure, opening the furnace, extracting the target body 20, and reattaching cap 23. If the semi-volatile trap 35 is employed, step 70 also entails transferring it to a shielded cask for shipment to the chemical separation process. At step 71, the primary containment is reattached to line 37 via valved port 24. Then, step 71 the target components are reassembled as depicted in FIG. 2 and the target is stored for the next irradiation cycle.

As noted above, the term "oxygen/chlorine mixture" encompasses any combination of chlorine gas plus an oxygen-containing species, including without limitation $O_2$, $O_3$, $H_2O$, $N_2O_x$, $NO_x$, $CO_xCl_2O$, and $ClO_x$ where x can take on any value (e.g. $N_2O$, $NO$, $NO_2$, $N_2O_4$, $CO$, $CO_2$, $ClO$, $Cl_2O$, $Cl_2O_2$, $ClO_2$, $ClO_3$). In addition, the ratio of oxygen atoms to chlorine atoms can range from 100:1 to $1:10^6$, provided that sufficient chlorine atoms are introduced to extract the available supply of Mo-99 within the nuclear fuel target and further provided that there is sufficient oxygen available to suppress the formation of nuclear fuel-chlorine species. Thus, while the process of the present invention is illustratively described as employing a discrete step of introducing an oxygen/chlorine mixture into the nuclear fuel target, one of ordinary skill could readily adapt the inventive process to continuously purge the nuclear fuel target with an oxygen/chlorine mixture, and such an arrangement still would fall within the scope of the present invention.

The Mo-99 trap 32 and other traps 33, 35 and 36, after being packaged in a suitably shielded shipping container, are transferred to chemical separation processing facilities either at a co-located site or at a remote site. At the processor, the Mo-99 and/or other desired isotopes are removed from the traps and processed using techniques known in the art to each desired isotope. Then the isolate isotopes, e.g., Mo-99 and package it for distribution to medical centers. The recovery chambers may be discarded, but more preferably are returned to for subsequent reuse with system 10. At step 70, nuclear fuel target 20 is returned to the fuel pool associated with the nuclear reactor to await a further irradiation and Mo-99 extraction cycle. It is expected that using the gas-phase extraction methods of the present invention, eight nuclear fuel targets may be irradiated in-reactor while eight others are processed to extract Mo-99 on an alternating 24-hour cycle. Of course, depending upon the size of the reactor, its neutron flux, the location within the reactor core, and the enrichment levels, more or fewer nuclear fuel targets may need to be irradiated and processed to obtain a desired daily amount of Mo-99.

It is contemplated that the nuclear fuel target suitable for use in the gas-phase extraction process of present invention may be configured to function as a nuclear fuel element in-reactor, such that it effectively functions as other fuel elements without adversely affecting the nuclear physics of the reactor. Because nuclear fuel target 20 is reused after each Mo-99 extraction step, it is expected to result in orders of magnitude less radioactive waste byproducts than previously-known Mo-99 production techniques, which result in complete destruction and reprocessing of a target each time the Mo-99 is harvested. By contrast, because nuclear fuel target 20 used in system of the present invention is reused after each extraction cycle, the nuclear fuel target may be reused either until its U-235 enrichment is depleted or nuclear fuel has been removed along with semi-volatile fission products to the point that it no longer generates sufficient quantities of Mo-99 to warrant further irradiation cycles. Advantageously, by substituting the nuclear fuel target described above for a conventional fuel element, Mo-99 can be produced domestically on an almost continuous basis with dramatically less radioactive waste byproduct than previously known methods and systems.

Applicant has conducted preliminary tests to date using depleted uranium and natural molybdenum to determine the efficacy of the gas-phase extraction method. In one such test, the applicant observed that the amount of molybdenum in the molybdenum/uranium powder mixture was reduced from 46,000 ppm prior to start of the test to a level of <0.1 ppm after 6 hours. In another test, the applicant irradiated 1.2 grams of a mixture of a few parts per million of natural molybdenum trioxide carrier in triuranium octoxide powder for 2 hours in a 1 MW TRIGA reactor. Applicant condensed the gas phase $MoO_2Cl_2$ and measured the Mo-99 in a gamma spectrometer, showing 72% of the predicted Mo-99 created from the fissioning of the powder was extracted. In addition to the Mo-99, other isotopes of interest were extracted by the process. Although many factors are expected to influence the effectiveness of the gas-phase extraction process, the applicant's initial tests appear promising as the amount of Mo-99 is expected to approach 0.1 ppm in actual practice.

While various illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed:

1. A method for producing and extracting a radioisotope fission product, the method including:
   (a) providing a target including solid phase uranium oxide;
   (b) irradiating, by a nuclear reactor, the target with neutrons so as to convert a first portion of the solid phase uranium oxide into oxides of radioisotope fission products;
   (c) gaseously extracting at least one of the oxides from the irradiated target of step (b), said extracting comprising halogenating the at least one of the oxides using an extraction gas including $Cl_2$ gas so as to produce at least one gas phase oxidized and halogenated radioisotope fission product, wherein the at least one gas phase oxidized and halogenated radioisotope fission product includes molybdenum-99, and so as to produce a first residual target including a remainder of the irradiated target of step (b) less the at least one of the oxides extracted;
   (d) irradiating, by the nuclear reactor, the first residual target of step (c) with neutrons so as to convert a second portion of the solid phase uranium oxide into oxides of the radioisotope fission products; and
   (e) gaseously extracting the at least one of the oxides from the irradiated first residual target of step (d), said extracting comprising halogenating the at least one of the oxides using the extraction gas so as to additionally produce at least one gas phase oxidized and halogenated radioisotope fission product.

2. The method of claim 1, wherein the solid phase uranium oxide provided in step (a) has a U-235 enrichment above about 20%.

3. The method of claim 1, wherein the solid phase uranium oxide provided in step (a) has a U-235 enrichment less than about 20%.

4. The method of claim 1, wherein the solid phase uranium oxide provided in step (a) includes $UO_3$ or $U_3O_8$.

5. The method of claim 1, wherein step (b) comprises irradiating the target in the nuclear reactor.

6. The method of claim 5, wherein step (c) comprises removing the target is from within the reactor for the extracting of step (c).

7. The method of claim 1, wherein step (b) comprises substituting the target for a nuclear reactor fuel element.

8. The method of claim 1, wherein the target provided in step (a) includes a primary containment.

9. The method of claim 1, wherein the target provided in step (a) comprises:
   a length of cladding having upper and lower ends and defining an interior space;
   upper and lower endcaps sealed to the upper and lower ends; and
   at least one gas port in fluid communication with the interior space; and
   wherein the uranium oxide is disposed within the interior space and has a form selected from the group consisting of powder, granules, or porous annular pellets.

10. The method of claim 9, wherein the target provided in step (a) further comprises a barrier layer disposed on an interior surface of the cladding.

11. The method of claim 9, wherein the cladding of the target provided in step (a) includes silicon carbide or quartz.

12. The method of claim 1, wherein the extracting of step (c) comprises converting the molybdenum-99 to molybdenum oxychloride ($MoO_2Cl_2$), a gaseous species.

13. The method of claim 1, the extraction gas of step (c) further including an oxygen-containing species selected from the group consisting of $O_x$, $H_2O$, $NO_x$, $CO_x$ and $ClO_x$, where x can take on any chemically permissible value.

14. The method of claim 1, wherein the extracting of step (c) comprises extracting a plurality of gaseous species.

15. The method of claim 1, wherein step (c) further comprises:
   using a gas inflow system coupled to the target to introduce the extraction gas into the target;
   heating the target to promote halogenating the at least one of the oxides using the extraction gas;
   using a gas outflow system coupled to the target to transfer the at least one gas phase oxidized and halogenated radioisotope fission product from the target; and
   collecting the transferred at least one gas phase oxidized and halogenated radioisotope fission product in a recovery chamber.

16. The method of claim 15, wherein the transferred at least one gas phase oxidized and halogenated radioisotope fission product of step (c) includes molybdenum oxychloride ($MoO_2Cl_2$).

17. The method of claim 15, wherein the target is heated during step (c) to a temperature in a range from about 200 C to about 1500 C.

18. The method of claim 15, wherein during step (c) the at least one gas phase oxidized and halogenated radioisotope fission product is transferred out of the target to the recovery chamber at a temperature sufficiently high to inhibit solidification of the at least one gas phase oxidized and halogenated radioisotope fission product during the transfer.

19. The method of claim 15, wherein during step (c), introducing the extraction gas into the target comprises continuously flowing the extraction gas into the target during the steps of converting, transferring, and collecting.

20. The method of claim 15, wherein during step (c), introducing the extraction gas into the target comprises initial introduction of the extraction gas, a period of no flow of the extraction gas during formation of the at least one gas phase oxidized and halogenated radioisotope fission product, and a resumed flow of the extraction gas to extract and transfer the at least one gas phase oxidized and halogenated radioisotope fission product.

21. The method of claim 15, step (c) further comprising, after transferring the at least one gas phase oxidized and halogenated radioisotope fission product out of the target, filling the target with a fill gas, and returning the target to the nuclear reactor for the irradiating of step (d).

22. The method of claim 1, wherein step (b) comprises irradiating the target adjacent to the nuclear reactor.

23. The method of claim 22, wherein step (c) comprises the target remaining adjacent to the nuclear reactor during the extracting of step (c).

24. The method of claim 22, wherein step (c) comprises removing the target from adjacent to the nuclear reactor for the extracting of step (c).

* * * * *